United States Patent [19]

Moran, Jr.

[11] Patent Number: 5,066,212

[45] Date of Patent: Nov. 19, 1991

[54] APPARATUS FOR BENDING PIPE

[75] Inventor: Thomas F. Moran, Jr., Chagrin Falls, Ohio

[73] Assignee: Midwest Plastic Fabricators, Chagrin Falls, Ohio

[21] Appl. No.: 496,859

[22] Filed: Mar. 21, 1990

[51] Int. Cl.$^5$ .................. B29C 53/08; B29C 53/84
[52] U.S. Cl. ........................... 425/145; 264/339;
425/340; 425/384; 425/392; 425/402
[58] Field of Search ............... 264/285, 339; 425/135,
425/145, 147, 169, 340, 383, 384, 392, 393, 394,
397, 402, 403.1

[56] References Cited

U.S. PATENT DOCUMENTS

| | | | |
|---|---|---|---|
| 3,861,847 | 1/1975 | Barnett | 264/339 |
| 3,884,612 | 5/1975 | Parmann | 425/392 |
| 3,890,079 | 6/1975 | Slater | 425/384 |
| 4,156,588 | 5/1979 | Miller et al. | 425/392 |
| 4,160,067 | 7/1979 | Patzner et al. | 264/339 |

Primary Examiner—Jay H. Woo
Assistant Examiner—James P. Mackey
Attorney, Agent, or Firm—Pearne, Gordon, McCoy & Granger

[57] ABSTRACT

An apparatus engages pre-cut lengths of heated thermoplastic pipe against a pair of eccentric wiper arms bending the pipes into elbows. The eccentric wiper arms have an eccentric portion and a constant radius portion. A bending form has an arcuate die adapted to hold a pre-cut length of pipe. Four such bending forms are radially connected to a rotation shaft which is journalled at each end to a support frame. A continuous supply of pre-cut lengths of pipe are transported through a heating chamber by a set of endless chains. Each pipe is then transferred to a bending form which is rotated by the shaft so that the cold end portions of each pipe engages the spaced apart and substantially parallel eccentric wiper arms. The wiper arms urge the end portion of each pipe length slightly beyond the outer edges of each arcuate die to compensate for the effect cooling has on each pipe length. Once the pipe is bent, the rotation of the bending form causes the pipe to drop into a tank of water. A pump circulates cooled water through the tank so that water is maintained at approximately 40° Fahrenheit. When water is pumped into the tank enough water flow is created to urge the elbows toward a conveyor belt. Another pump creates water flow that urges the elbows onto the conveyor belt which removes the elbows from the tank and drops them in a storage bin.

24 Claims, 5 Drawing Sheets

APPARATUS FOR BENDING PIPE

BACKGROUND OF THE INVENTION

1. Field of the Invention

This invention relates generally to bending pipe, and specifically to an apparatus for bending heated, pre-cut lengths of thermoplastic, particularly polyvinyl chloride (PVC), pipe into elbows.

2. Description of the Prior Art

Elbows made from PVC pipe have many uses, including as conduits to string electrical wires through when wiring residential, commercial, or other buildings, or when introducing wire underground. A PVC elbow ordinarily has pipe coupled at each end to complete the wiring job. Depending upon the user's specifications to complete a particular job, PVC elbows are usually supplied having an inside diameter ranging between 0.5 inches to over 6 inches and a specific radius of curvature. PVC elbows of this type are generally required to have a degree of bend as small as 5° but not to exceed 90°, with a tolerance of about plus or minus 2°.

Apparatus for bending PVC pipe are known in the art. U.S. Pat. No. 3,890,079 issued to Slater discloses an automatic machine for bending and then flaring the ends of plastic pipe. This is accomplished by a two-piece die between which a straight pipe is placed. One piece of the die is mechanically translated toward the other stationary piece thereby bending the pipe into an elbow. Injection plugs are inserted in each end of the elbow thereby flaring the ends. Air is injected into the pipe to internally support it thereby preventing any significant deformations. Once the pipe has been shaped, the injection plugs inject water into the pipe, and the pipe is dropped into a tank of coolant.

Another apparatus for bending thermoplastic pipe is described in U.S. Pat. No. 3,884,612 issued to Parmann. Parmann discloses a method and apparatus for bending thermoplastic pipe wherein the steps are carried out at a single location while one end of the pipe is held in a fixed position. The pipe is first heated internally by a hot compressed air stream, and then a rubber container is lowered into the pipe so that pressure can be exerted against the interior walls of the pipe. The hot compressed air stream can be applied at various angles and pressures depending upon which part of the pipe is to be fashioned. Both aforementioned patents require that the pipe be internally supported during the bending operations.

Another prior are technique for bending PVC pipe is to heat a length of pipe and place it into a hand-held bending form. The bending form includes an elbow shaped die to which the heated pipe conforms when bent. One end of the elbow shaped die has an extrusion over which one end of the heated pipe is placed. A spring is inserted in the pipe so the pipe will maintain its shape while bending. A worker bends the heated pipe by hand until it is formed against the elbow shaped die. A plug hinged to the other end of the die is inserted into the pipe to hold the pipe against the die while cooling. The bending form is then submersed into a water bath and held until the PVC pipe cools sufficiently to retain the elbow shape. Once the elbow is cooled, the worker removes the bending form from the tank, removes the hinged plug and the spring from the elbow, removes the elbow from the bending form, and places the elbow into the water bath to assure complete cooling. The worker then gets another heated length of pipe and repeats the entire procedure. This procedure is disadvantageous because it requires the worker to perform several steps on the work piece and is time consuming. Furthermore, because the process is performed substantially by hand workers may experience fatigue in their hands and therefore require periodic rests.

Additionally, the elbow shaped dies which form part of the hand-held bending form have been constructed from metals, such as aluminum, and from plastics. It has been discovered that a plastic die having a low thermal conductivity allows proper cooling of the elbows. Metal dies allow too much heat to transfer from the heated length of pipe to the die which can lead to an improper cooling of the elbow. Improper cooling often results in the skin of the elbow becoming wrinkled or deformations occurring throughout the wall thickness of the pipe.

SUMMARY OF THE INVENTION

The present invention provides an apparatus for continuously and automatically bending lengths of PVC pipe. This is accomplished by a new and unique apparatus that includes a plurality of arcuate dies, each die being adapted to hold a length of pipe that will be formed to the radius of the die. The apparatus movingly engages each length of pipe against a pair of eccentric wiper arms thereby urging the end portions of each length toward one of the arcuate dies until the length of pipe is formed against the die. The apparatus is adaptable for bending plastic pipe which must ordinarily be pre-heated. The preferred embodiment of the present invention bends pre-heated lengths of PVC pipe into elbows subsequently submersing them into a water bath so they cool and maintain their elbow shape. The elbows are removed from the water bath and placed in a storage bin.

The preferred embodiment of the present invention also provides a retaining bin into which pre-cut lengths of PVC pipe are stacked prior to heating. The retaining bin is situated above a conveyor belt that transports the pre-cut lengths of pipe from the retaining bin to the entrance of a heating chamber. The conveyor belt is mechanically responsive to a sensing device located near the entrance of the heating chamber. When the sensing device detects that there are not a predetermined number of pipe lengths adjacent the entrance of the heating chamber additional pipe lengths are transported from the retaining bin to the heating chamber's entrance.

The heating chamber includes a heating element which imparts heat near the center and longitudinally toward the ends of the pipe lengths. The heating chamber has heat shields extending downwardly from the heating elements that help prevent the end portions of the pipe lengths from heating as they pass through the heating chamber. It is important that the end portions of the pipe lengths remain relatively cool so their diameter is not altered during the bending process. This assures that the elbows can be properly connected to other pipe.

After heating, each length of pipe is transferred to a bending form. Each bending form includes an arcuate die joined to it in which a length of pipe is held. Each arcuate die has a constant radius of curvature, and is substantially U-shaped in cross section. The center portion of each arcuate die is narrower in cross section than its ends, and acts as a fulcrum about which a length of pipe is bent. The narrower center portion applies external pressure near the center of each pipe length when bending to prevent kinking of the pipe.

A plurality of bending forms are radially connected to a shaft and circumferentially spaced apart thereby forming a paddle wheel. The shaft is journalled at each end in a fixed position relative to the spaced apart eccentric wiper arms so that when the paddle wheel rotates the relatively cool end portions of each length of pipe engage the eccentric wiper arms. The initial engagement begins urging the cool end portions of each length of pipe toward the arcuate die holding that length of pipe.

As each arcuate die rotates, the cool end portions are continuously urged toward the arcuate die as the eccentric curvature of each wiper arm gradually moves closer to the longitudinal axis of the shaft. Each wiper arm lies in a relatively vertical plane. The vertical planes are angled inwardly toward one another so that the wiper arms are closer to one another where each pipe length initially engages them than they are where each pipe length is substantially formed against the die. Thus, the eccentric curvature of each wiper arm gradually moves outwardly along the surface of each pipe length while simultaneously urging the cold end portions toward the arcuate die. The outward movement imparts a stretching action onto each pipe length that helps reduce the likelihood of kinks forming in the pipe. The rotation of the paddle wheel submerges the elbows into a water bath where they drop via gravity from the bending forms. The elbows are subsequently removed from the water bath and placed in a storage bin.

The preferred embodiment of the present invention realizes an increase in productivity of about 3-5 times that which was realized by the hand-held bending form. Also, the present invention has the advantage of eliminating the necessity of internally supporting each pipe length during bending. This is accomplished through a pinching action generated by the narrow center portion of the arcuate die. The external pinching action helps prevent each pipe length from kinking as they are bent around the center portion of the die. Furthermore, the preferred embodiment does not require a spring for internal support of the pipe so a tighter radius of curvature can be achieved.

The prior art technique using the hand-held form prevents water from entering the pipe when initially inserted into the water bath because there are plugs in the ends of the pipe. The preferred embodiment of the present invention eliminates these plugs thereby allowing water to enter inside each pipe length immediately after being bent into an elbow which allows them to cool faster. It is advantageous to cool the lengths of pipe quickly so they will more aptly retain their bent shape.

DETAILED DESCRIPTION OF THE PREFERRED EMBODIMENT

Figure 1:
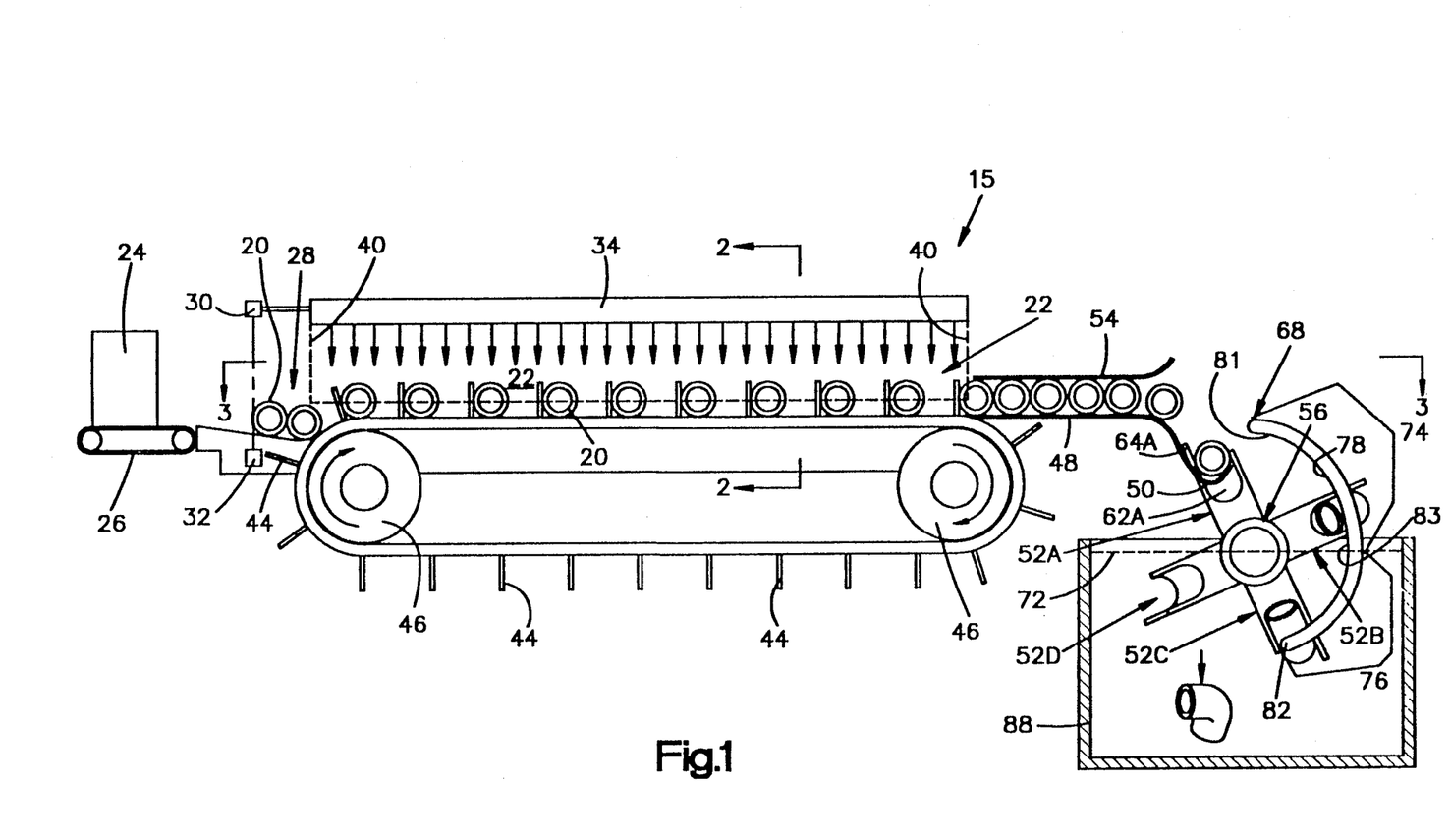
FIG. 1 is a side elevational view according to the preferred embodiment of the present invention.

Referring now to the drawings, and in particular to FIG. 1, there is shown a side view of the preferred embodiment of the apparatus of the present invention generally referred to by reference numeral 15. A multiplicity of pre-cut lengths of PVC pipe 20 are shown being transported from a retaining bin 24, through a heating chamber 22, and to a paddle wheel 56.

The lengths of pipe 20 are initially oriented by stacking them inside the storage bin 24 which can be made of any suitable material such as wood, plastic, or metal. Alternatively, the pipe lengths 20 could be managed in any suitable manner before being transported to the heating chamber 22. A conveyor belt 26 is arranged to transport the lengths of pipe 20 from the storage bin 24 to the entrance 28 of the heating chamber 22. The conveyor belt 26 can be of any conventional type and is mechanically responsive to a sensing device located near the entrance 28. The sensing device includes a light source 30 and a photo detector 32. It is apparent the sensing device could be made from other suitable components such as a suitably arranged microswitch. When the light beam from the light source 30 to the photo detector 32 is unobstructed, the sensing device activates the conveyor belt 26 which transports additional pipe lengths to the entrance 28. Thus, pipe lengths 20 are continuously supplied to the heating chamber 22. Alternatively, the pipe lengths 20 could be transferred to the heating chamber 22 in any suitable manner.

Referring again to FIG. 1, the heating chamber 22 includes a heating element 34 which radiates heat onto the pipe lengths 20 as they move through the heating chamber 22. The heating element 34 is preferably a multiplicity of parallel quartz infra-red type rods, but could be of any other suitable type known in the art. The lengths of PVC pipe 20 are heated to approximately 325° Fahrenheit by the time they exit heating chamber 22.

Figure 2:
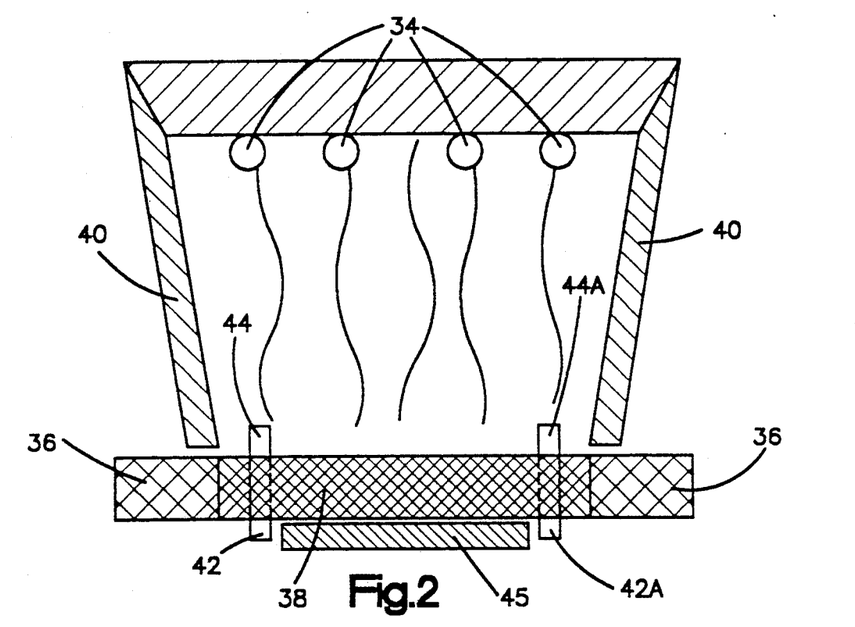
FIG. 2 is a cross-sectional end view taken along line 2—2 of FIG. 1.

Each pipe length 20 is rotated by posts 44 and 44A over a relatively flat, preferably aluminum plate 45 that is approximately the width shown between endless chains 42 and 42A as shown in FIG. 2. The aluminum plate 45 is preferably between 0.25 and 0.375 inches thick and absorbs heat from heating element 34. Thus, each pipe length 20 is heated by a combination of infrared heat from above and conductive heat from the aluminum plate 45 below. This combination speeds and concentrates the heating of each pipe length 20. The aluminum plate 45 is attached to a support frame (not shown) via a slot and bolt combination to allow the plate 45 to expand and contract from heat exposure.

The heating element 34 is preferably mounted above the pipe lengths 20, but could alternatively be mounted below them. When heating, the end portions 36 of each pipe length 20 remain cool relative to their center portion 38, as best shown in FIG. 2, in which a pipe length 20 is cross hatched to illustrate the concentration of heat applied to each length of pipe 20. The denser hatching represents heated pipe. The heating element 34 in FIG. 2 permits relatively rapid heating of the center portion 38 of each pipe length 20 thereby maintaining relatively cool end portions 36. Slower heating would allow the ends 36 to become too warm or hot which might cause deformations during the bending process thereby preventing the ends 36 from being properly joined to other pipe.

FIG. 2 shows heat shields 40 extending downwardly from the heating element 34 to a point that is preferably just above the pipe lengths 20 passing through the heating chamber 22. The heat shields 40 help prevent the end portions 36 of each pipe length 20 from becoming too warm by directing the heat from the heating element 34 toward the center portions 38 of each pipe length 20. The heat shields 40 preferably span the length of the heating chamber 22, as shown in FIG. 3, as does the aluminum plate 45 and the heating element 34.

Figure 3:
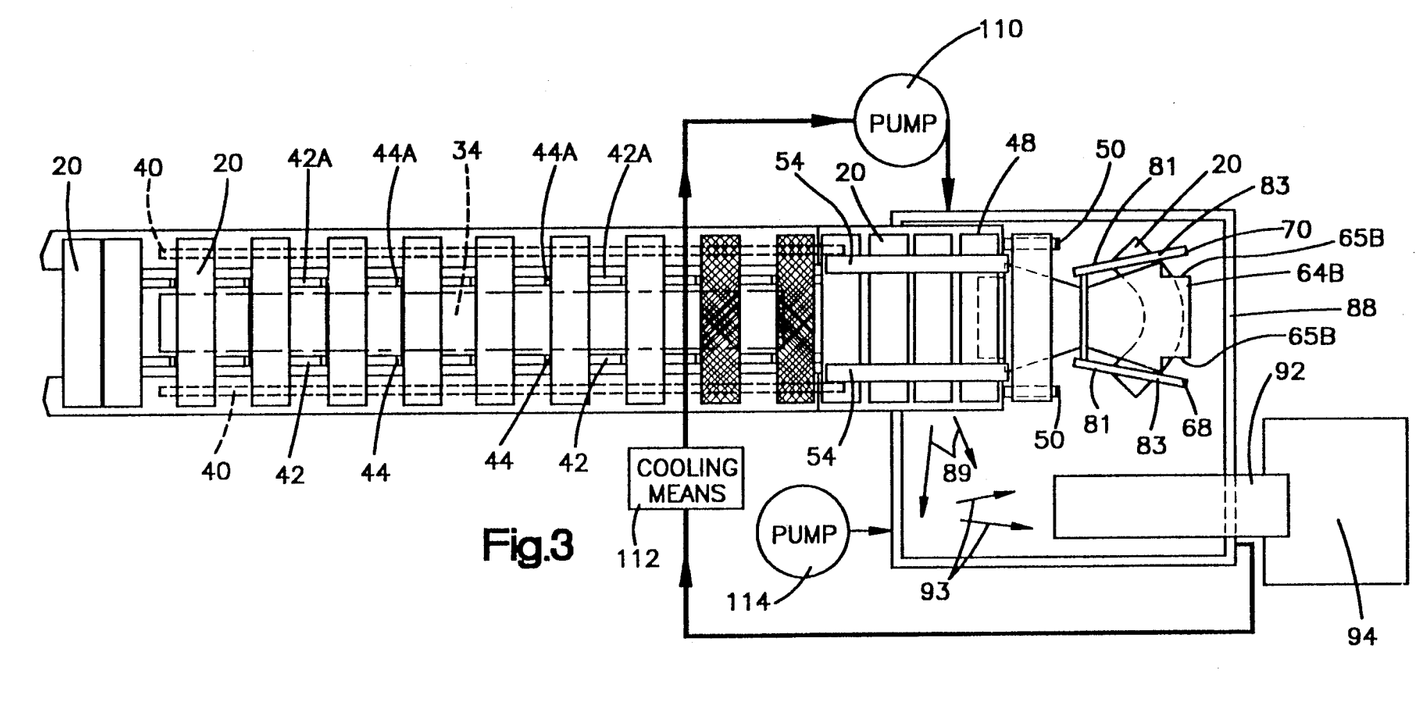
FIG. 3 is a top plan view taken along line 3—3 of FIG. 1 with cooling means and pumps schematically shown.

Referring to FIGS. 1 and 3, the pipe lengths 20 are transported through the heating chamber 22 on a pair of parallel endless chains 42 and 42A that have rigidly connected thereto a multiplicity of posts 44 and 44A. It is apparent that alternative means are available and may be used to transport the lengths of pipe 20 through the heating chamber 22, such as a conveyor belt made of appropriate material. The chains 42 and 42A are reeved about a set of sprockets 46 rotatably mounted upon a support frame (not shown). The sprockets 46 can be mechanically driven in any conventional manner. It is preferred the sprockets 46 be driven by a variable speed motor so that the speed the pipe lengths 20 are transported through the heating chamber 22 can be adjusted. This is desirable because the physical properties of different batches of PVC pipe sometimes vary so the required heating times may also vary. Also, the ambient temperature may vary from winter to summer causing more or less required heating time. The variable speed motor allows various batches of PVC pipe lengths to be transported through the heating chamber 22 for the time period required to heat them to the proper bending temperture.

The posts 44 and 44A are preferably symmetrically arranged so that a post 44 on one chain 42 and an opposing post 44A on the other chain 42A are in a vertical plane which is perpendicular to the parallel chains 42 and 42A, as best shown in FIG. 2. The rotational speeds of the chains 42 and 42A are synchronized so that a set of two posts picks up one PVC pipe length 20 as the pipe length 20 waits at the entrance 28 to the heating chamber 22, as best shown in FIG. 1. The path of the chains 42 and 42A is preferably inclined upwardly from the entrance 28 to the other end of the heating chamber 22. Thus, each pipe length 20 rests against a set of posts and above the aluminum plate 45 as they pass through the heating chamber 22.

After heating, each pipe length 20 exits the heating chamber 22 and moves onto a transfer plate 48, as best shown in FIG. 1. Attached to one end of the transfer plate 48 are two retaining hooks 50 that suspend each pipe length 20 in a stationary position until they are transferred to one of the bending forms 52A, 52B, 52C and 52D.

FIGS. 1 and 3 show guide arms 54 positioned above the transfer plate 48 to help assure that the pipe lengths 20 make an orderly transition toward the retaining hooks 50. The guide arms 54 are preferably elongated strips of mechanically biased metal disposed substantially parallel to each other. The mechanical bias exerts pressure downwardly on the pipe lengths 20 and prevents them from moving forward too abruptly as they come off the chains 42 and 42A and are pushed onto the transfer plate 48. A preferred embodiment of the present invention bends pipe lengths having an inside diameter of approximately 0.75 inches. When pipe lengths having this diameter are pushed onto the transfer plate 48 they tend to jump upwardly when pushed into one another so the guide arms 54 are preferred for an orderly transition. It has been discovered that pipe lengths having inside diameters larger than 0.75 inches tend not to jump upwardly when being pushed onto the transfer plate 48 and usually do not require the guide arms 54 for an orderly transition.

Referring again to FIG. 1, as the pipe lengths 20 exit the heating chamber 22 they accumulate between the transfer plate 48 and the guide arms 54 until one length of pipe 20 is pushed into the retaining hooks 50. As one length of pipe 20 exists the heating chamber 22 it pushes the length of pipe 20 immediately in front of it forward. Thus, the pipe lengths 20 are continuously moved into position to be transferred to the bending forms 52A, 52B, 52C, and 52D which will be fully described hereinafter.

Figure 10:
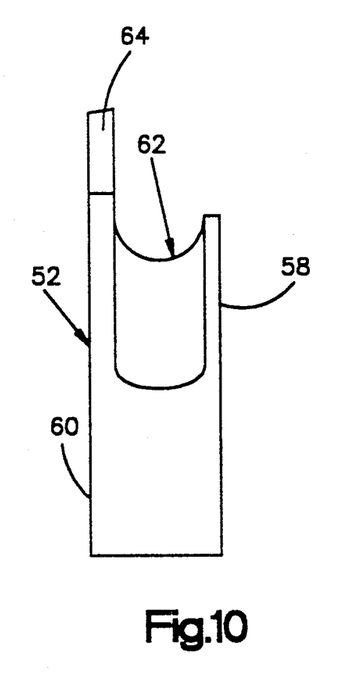
FIG. 10 is a detailed side elevational view of one bending form of the paddle wheel of FIG. 4 shown to a larger scale.
Figure 11:
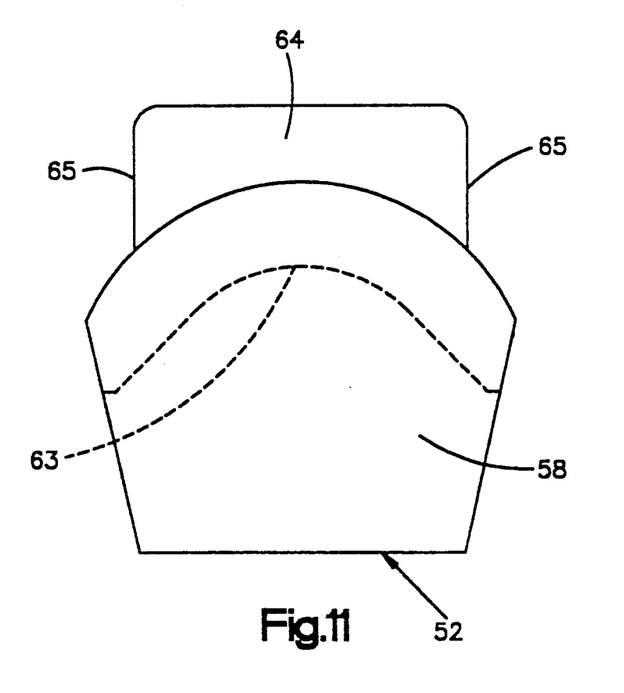
FIG. 11 is a front elevational view of the bending form of FIG. 10.

Referring to FIG. 10 and 11, the bending form 52, which is representative of each of the bending forms 52A, 52B, 52C and 52D, includes a front arcuate plate 58 joined to a rear arcuate plate 60. It is apparent these plates could be various other shapes such as square or rectangular, but preferably they are arcuate. Disposed between the arcuate plates 58 and 60 is an arcuate die 62 that defines a bending surface against which each length of pipe 20 is formed. The bending form 52 is employed as means for supporting the arcuate die 62. The arcuate die 62 is preferably made of a material having a low thermal conductivity, such as fiber glass reinforced polyester resin, thermoplastic resins, thermoset resins, or any other suitable material. Material having a low thermal conductivity minimizes the heat transfer between the arcuate die 62 and a heated pipe length 20. A low thermal conductivity prevents the pipe length 20 from cooling too rapidly while in the die 62. The arcuate die 62 is preferably made of type 1 polyvinyl chloride having a thermal conductivity of 1.10 Btu/(h)(ft)(° F.)

The arcuate die 62 is substantially U-shaped in transverse cross section providing a saddle in which each pipe length 20 is held. The center portion 63, which is an arc of approximately 1 inch, of the arcuate die 62 is narrower in transverse cross section between plates 58, 60 than either end of the arcuate die 62, as shown in FIG. 10. The width of the center portion 63 between plates 58, 60 is slightly smaller than the outside diameter of each pipe length 20. This causes each pipe length 20 to be externally pinched near the midpoint of their center portion 38 during bending to prevent kinking or collapsing of each pipe length 20. The external pinching action of the preferred embodiment eliminates the necessity of providing internal pressure to prevent kinking or collapsing of the pipe during bending. Alternatively, internal support means could be introduced into the pipe lengths 20. Pipe lengths having inside diameters larger than 0.5 inches, or relatively thin walls, or made of material susceptible of kinking or collapsing may require internal support means during bending.

The arcuate die 62 of the preferred embodiment holds a pipe length 20 having an outside diameter of approximately 0.875 inches. It is apparent that the bending form 52 could be modified to support an arcuate die adapted to hold lengths of pipe having larger or smaller outside diameters than 0.875 inches.

The bending form 52 further includes a receiving plate 64 attached to the rear arcuate plate 60 in any suitable manner that lifts a pipe length 20 from the retaining hooks 58 and guides it into the arcuate die 62, as shown with reference to receiving plate 64A in FIG. 1. The receiving plate 64 also helps prevent the pipe length 20 from coming out of the arcuate die 62 when subjected to bending forces. Referring to FIG. 11, the receiving plate 64 extends to a width sufficient for its outer edges 65 to overlap onto the cool end portions 36 of a pipe length 20 held in the arcuate die 62, but not so far as to interfere with a pair of wiper arms 68, 70 during bending as shown with reference to the outer edges 65B shown in FIG. 3. This substantially reduces the chance of distorting each pipe length 20 because the outer edges 65 do not come into contact with the heated center portion 38.

The preferred embodiment of the present invention provides a paddle wheel 56 that includes four of the previously described bending forms 52A, 52B, 52C, and 52D radially connected to a shaft 66 in any conventional manner as best shown in FIGS. 1, 4, 5, and 6. Preferably, the paddle wheel 56 rotates clockwise as shown in FIGS. 1, 4, 5, and 6. Each bending form 52A, 52B, 52C, and 52D is identical to the bending form 52 described above. The shaft 66 is journalled at each end in a fixed position relative to the eccentric wiper arms 68, 70, as best shown in FIG. 1. The shaft 66 can be rotated in any suitable manner. Preferably, the shaft 66 is driven by a variable speed motor so the rotational speed of the paddle wheel 56 can be synchronized with the rotational speed of the drive chains 42 and 42A. Thus, the pipe lengths 20 can be consecutively transferred from the retaining hooks 50 to the bending forms 52A, 52B, 52C, and 52D, i.e., as one pipe length 20 is picked up from the retaining hooks 50 another pipe length 20 is pushed forward into the retaining hooks 50 so that the next bending form can pick it up. In this manner, no bending form will pass the retaining hooks 50 without picking up a length of pipe 20. Preferably, the motor driving the shaft 66 is also reversible so that if any jams occur during the bending procedure the paddle wheel 56 may be reversed and the jam eliminated.

Figure 7:
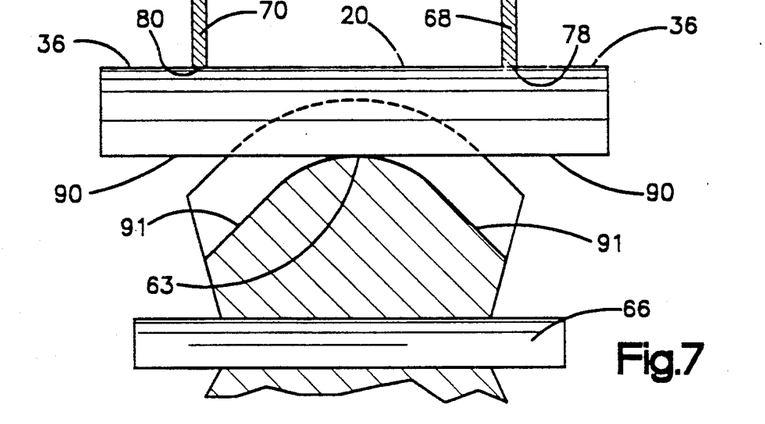
FIG. 7 is a sectional view taken along section line 7—7 of FIG. 5.
Figure 8:
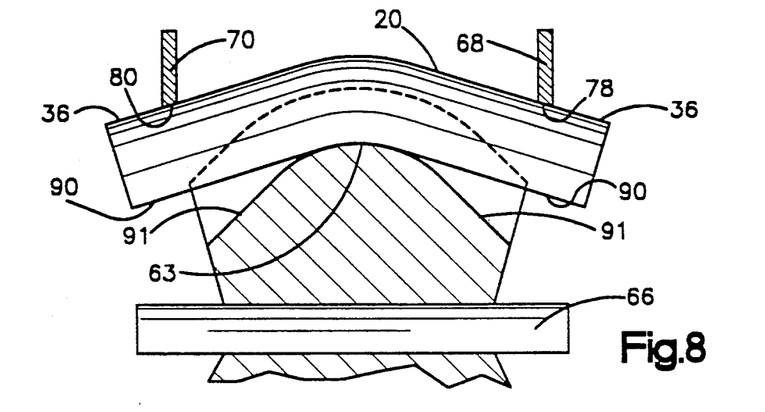
FIG. 8 is a sectional view taken along section line 8—8 of FIG. 4.
Figure 9:
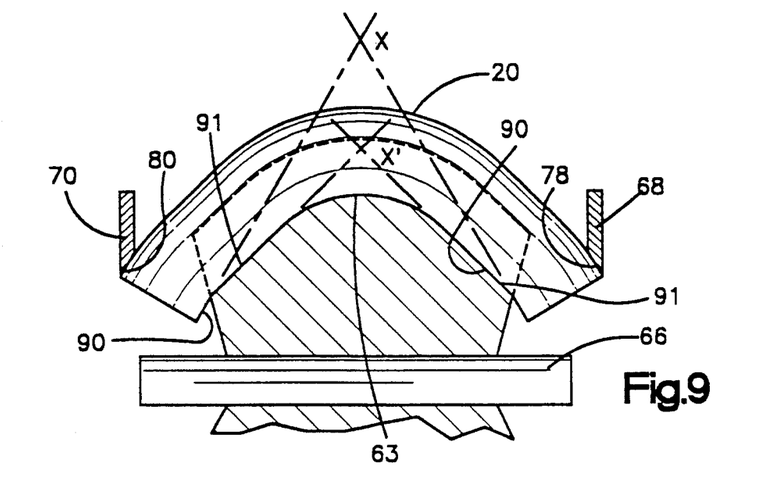
FIG. 9 is a sectional view taken along the line 9—9 of FIG. 6.

The interaction of the paddle wheel 56 with the eccentric wiper arms 68, 70 will now be described. Reference will be made to only one bending form 52A and its associated elements but it is understood that all the bending forms 52A, 52B, 52C and 52D operate in precisely the same manner. Referring to FIG. 1, when the receiving plate 64A of the bending form 52A lifts a pipe length 20 from the retaining hooks 50 the pipe length 20 is held within the arcuate die 62A. The inside radius of each wiper arm 68, 70 includes camming surfaces 78, 80, respectively, as best shown in FIGS. 7, 8, and 9. The wiper arms 68, 70 are aligned with the paddle wheel 56 so that one of the wiper arms 68, 70 engages one end portion 36 of the pipe length 20, and the other wiper arm engages the other end portion 36 when the paddle wheel 56 rotates. The rotation of the paddle wheel 56 continuously engages the cool end portions 36 of the pipe length 20 against the camming surfaces 78, 79 as best shown in FIGS. 3, 7, 8, and 9.

Figure 4:
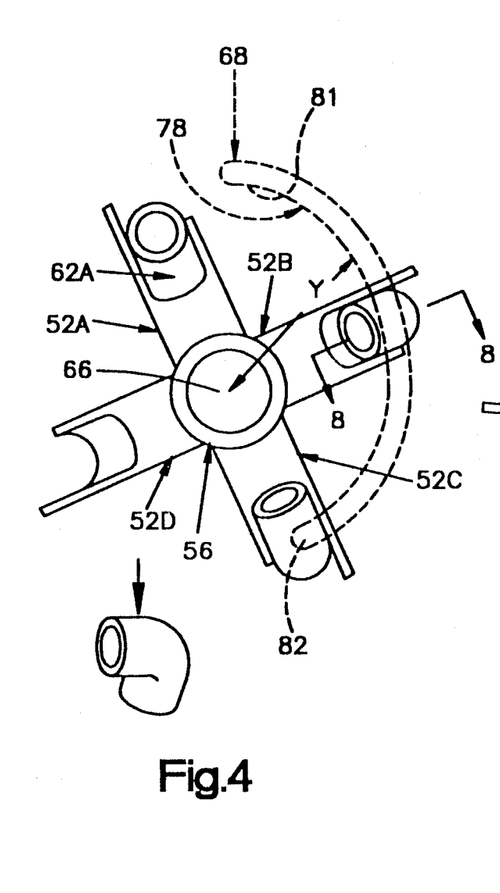
FIG. 4 is a detailed side elevational view of the paddle wheel of FIG. 1 shown to a larger scale.
Figure 5:
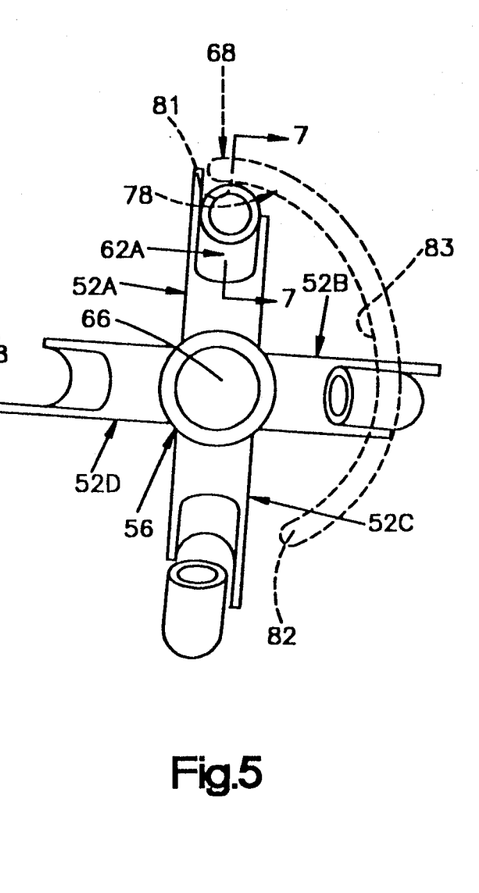
FIG. 5 is a view similar to FIG. 4 showing the paddle wheel rotated clockwise.
Figure 6:
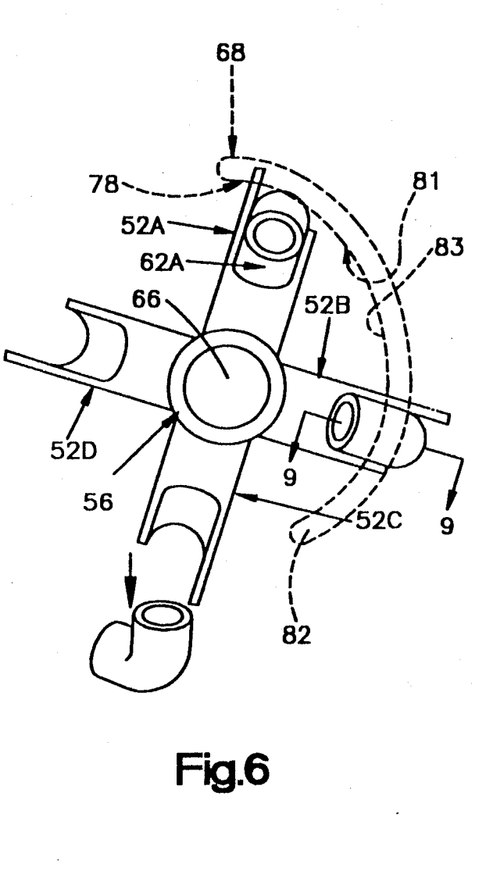
FIG. 6 is a view similar to FIG. 5 showing the paddle wheel rotated further clockwise.

Each camming surface 78, 80 includes a distal portion 81 and a proximal portion 83 as best shown in FIGS. 4, 5, and 6. Each distal portion 81 is spaced a first distance radially from the longitudinal axis of the shaft 66 and each proximal portion 83 is spaced a second distance radially from the longitudinal axis of the shaft 66. The preferred embodiment spaces the distal portions 81 of both camming surfaces 78, 80 the same first distance, and the proximal portions 83 of both camming surfaces 78, 80 the same second distance from the longitudinal axis of the shaft 66. Alternatively, the distal portions 81 could be staggered relative to the longitudinal axis of the shaft 66, and/or the proximal portions could be staggered relative to the longitudinal axis of the shaft 66. For example, the distal portion 81 of one camming surface 78, 80 could be spaced farther from the longitudinal axis of the shaft 66 than the distal portion 81 of the other camming surface, or the proximal portion 83 of one camming surface 78, 80 could be spaced closer to the longitudinal axis of the shaft 66 than the proximal portion 83 of the other camming surface, or both. Thus, as the paddle wheel 56 rotates one camming surface 78, 80 would not displace the end portion 36 engaging it as far toward the arcuate die 62A as the other camming surface 79, 80 would the end portion 36 engaging it. By varying the distance Y that the camming surfaces 78, 80 are radially spaced from the longitudinal axis of the shaft 66, as shown in FIG. 4, the distance the end portions 36 are displaced toward the arcuate die 62A can be controlled.

As the paddle wheel 56, and consequently the bending forms 52A, 52B, 52C, and 52D, rotate, each associated arcuate die moves along a line of travel between at least a first position and a second position. The arcuate die 62A is at the first position when the end portions 36 of a pipe length 20 held therein engage the distal portions 81. The radius of curvature of the camming surface of each eccentric wiper arm 68, 70 uniformly decreases from the distal portions 81 to the proximal portions 83 so that as the paddle wheel rotates clockwise in FIGS. 4, 5, and 6, the camming surfaces 78, 80 gradually approach the longitudinal axis of the shaft 66. The cool end portions 36 of the pipe length 20 continuously engage the camming surfaces 78, 80 as the paddle wheel 56 rotates clockwise in FIGS. 4, 5, and 6. The arcuate die 62A reaches the second position when the end portions 36 are engaging the proximal portions 83 where the pipe length 20 is substantially formed against the arcuate die 62A. The end portions 36 overhang the outer edges of the arcuate die 62A when the pipe length 20 is formed thereagainst.

When the paddle wheel 56 rotates past the proximal portions 83 the end portions 36 of the pipe length 20 can be urged slightly past the outer edges of the arcuate die 62A if the wiper arms 68, 70 are positioned close enough to the longitudinal axis of the shaft 66. Thus, the end portions 36 are bent beyond the radius of curvature that would be obtained if the pipe length 20 was merely formed against the arcuate die 62A. FIG. 9 shows a pipe length 20 formed against the arcuate die 62B with the end portions urged slightly beyond the outer edges of the arcuate die. The preferred embodiment urges the end portions 36 slightly past the outer edges of the arcuate die 62 to form a working degree of bend equal to the angle X that is measured with reference to the excluded angle formed by the intersection of two imaginary lines extending from the end portions 36 of each pipe length 20 as shown in FIG. 9. This angle may be adjusted by varying the distance Y that the camming surfaces 78, 80 are spaced from the longitudinal axis of the shaft (FIG. 4). The working degree of bend X is greater than a final degree of bend x', which is measured the same way as angle X but when the pipe length 20 has cooled, to compensate for shrinkage of the pipe length 20 during cooling.

Referring to FIGS. 8 and 9, a portion of each camming surface 78, 80 is beveled. The beveled surface portions begin approximately at the distal portions 81 and continue to the ends 82 of the wiper arms 68, 70. The beveled surface portions uniformly change angles between the distal portions 81 and the proximal portions 83 so that the beveled surface portions remain substantially tangent to the surface of a pipe length 20 engaging the camming surfaces 78, 80. Thus, the camming surfaces 78, 80 remain relatively flat against the surface of each pipe length 20 during engagement.

Referring to FIG. 3, the eccentric wiper arms 68, 70 each lie in a plane which is angled relative to the vertical with the distal portions 81 closer horizontally to each other than the proximal portions 83 are spaced horizontally to each other. Thus, as the end portions 36 of each pipe length 20 engage the camming surfaces 78, 80 from the distal portions 81 to the proximal portions 83, the points of engagement between the surface of each pipe length 20 and the camming surfaces 78, 80 diverge, as best shown by comparing FIGS. 7, 8, and 9. Thus, the camming surfaces 78, 80 move outwardly toward the outer edge of each end portion 36. The outward movement imparts a longitudinal stretching action upon the surface of each pipe length 20 that helps prevent deformations in the pipe lengths 20.

Additionally, as the pipe lengths 20 engage the camming surfaces 78, 79, a radial and lateral force is exerted against the eccentric wiper arms 68 and 70. Each eccentric wiper arm 68, 70 has a pair of reinforcing rods connected between it and the support frame (not shown). The reinforcing rods prevent the eccentric wiper arms 68 and 70 from being pushed too far apart during the engagement of each pipe length 20 thereagainst.

When bending PVC lengths of pipe into elbows through which electrical wire will be fed, it is important to control the resulting radius of curvature and final degree of bend of the formed elbows. The radius of curvature must be large enough so that the friction created between the interior surface of the elbow and the wire being pulled therethrough is not great enough to cause a wearing away of the interior wall of the elbow, or the sheathing of the wire. The degree of bend is important for changing conduit direction on a wiring job site.

The preferred embodiment of the present invention bends type 2 polyvinyl chloride pipe into elbows having a final degree of bend equal to approximately 90° and a radius of curvature of approximately 4 inches. It is believed that the preferred embodiment can be adapted to form elbows having a final degree of bend from between about 5° to about 180°.

The radius of curvature of each pipe length 20 formed into an elbow is measured to the longitudinal axis of each elbow. It is believed that the arcuate die 62 can be adapted to form PVC elbows to a wide range of radius of curvatures from between about four inches to about 48 inches. The capability of the preferred embodiment to form elbows to a desired radius of curvature depends somewhat on the bending characteristics of the material being formed.

Type 2 PVC pipe lengths expand in length somewhat when heated. Furthermore, type 2 PVC has a propensity to reconform itself to its original shape when cooling. A heated elbow of type 2 PVC tends to shrink in length and straighten when cooling. Thus, means must be employed to form an elbow having a predetermined radius of curvature and a predetermined degree of bend taking into account the effect the cooling process has on each bent length of pipe 20.

Referring to FIG. 9, the eccentric wiper arms 68, 70 of the preferred embodiment are movably mounted to the support frame (not shown) in any suitable manner so that the distance Y between any point along the camming surfaces 78, 80 and the longitudinal axis of the shaft 66 can be adjusted. The distance the end portions 36 are displaced toward the arcuate die 62 after engaging the camming surfaces 78, 80 is a function of the distance Y at any point along the camming surfaces 78, 79. For example, the distance Y may be such that the inside radius 90 of the end portions 36 are never formed against the interior surface 91 of the arcuate die 62. Thus, an elbow would be formed having a radius of curvature that is larger than the radius of curvature of the arcuate die 62.

The arcuate die 62 of the preferred embodiment has a constant radius of curvature. When each pipe length 20 is substantially formed against the arcuate die 62, as shown in FIG. 9, the end portions 36 overhang the outer edges of the arcuate die 62. The eccentric wiper arms 68, 70 are advantageously employed to urge the end portions 36 slightly beyond the outer edges of the arcuate die 62 to form the working degree of bend measured by the angle X that is greater than the final degree of bend of the elbow when cooled. This is accomplished by appropriately spacing the camming surfaces 78, 80 from the longitudinal axis of the shaft 66. The wiper arms 68, 70 according to the preferred embodiment, urge the end portions 36 of each pipe length 20 slightly beyond the outer edges of the arcuate die 62 to form the angle X equal to approximately 95°. Consequently, when the elbow is completely cooled the final degree of bend is approximately 90°.

The radius of curvature of the arcuate die 62 of the preferred embodiment is dictated by the radius of curvature desired in the formed elbow. The formula is: $R = r - 0.5(d)$, where R is the radius of curvature of the arcuate die 62; r is the desired radius of curvature of the formed elbow measured to its longitudinal axis; and d is the outside diameter of the pipe length 20 to be formed into the elbow, can be used to determine the radius of curvature of the arcuate die 62.

Referring to FIG. 1, eccentric wiper arm 68 is shown partially submersed below the water level 72. Preferably, the water level 72 divides the eccentric wiper arm 68 into two portions; an eccentric portion 74, which is mostly above the water level 72, and a constant radius portion 76, which is mostly below the water level 72. The same is true for eccentric wiper arm 70. Thus, immediately after each pipe length 20 is formed against the arcuate die 62 and the end portions 36 are urged the desired distance beyond the outer edges of the arcuate die 62 each pipe length 20 is submersed within a water bath to cool and drop via gravity from the arcuate die 62. It is apparent that the water level could be another level if desired. The constant radius portions 76 assure that each length of pipe 20 remains conformed to the arcuate die 62 until the length of pipe 20 passes the ends 82 of the eccentric wiper arms 68, 70 and drops from the arcuate die 62. Alternatively, the ends 82 could extend to a point where each pipe length is lifted from the water bath and subsequently removed from the paddle wheel 56.

As each pipe length 20 is submersed in the water bath the rotation causes the ends of each pipe length 20 to point upwardly so that each pipe length 20 substantially fills with water thereby facilitating the cooling process. It is advantageous to cool each pipe length 20 quickly before they drop from the arcuate die 62 so they will not shrink past the final degree of bend of approximately 90° after dropping into the water bath.

The preferred embodiment of the present invention bends heated polyvinyl chloride pipe lengths into elbows and submerses them into a water bath for cooling so the elbows will maintain their bent condition. Alternatively, other coolants could be used to assure the bent pipe lengths maintain their elbow shape. For example, liquids having a low boiling point such as liquid nitrogen or liquid ethane could be sprayed onto the bent pipe to absorb the heat thereby cooling the pipe and maintaining them in their bent condition. The specific composition of the material being bent will dictate the means necessary to maintain the material in its bent shape.

As previously mentioned, after the pipe lengths 20 are bent into elbows they drop via gravity from the bending forms 52A, 52B, 52C, and 52D into the tank 88 that contains the water bath. A stripper rod (not shown) can be secured within the tank 88 to make sure the elbows are removed from the bending forms if they do not freely drop out. The stripper rod is positioned so that if a pipe length 20 remains in an arcuate die after passing the ends 82, the pipe length will impinge against the stripper rod and drop into the tank 88.

It is preferred that the tank 88 contains a water bath having a temperature range between about 35 and 40 degrees Fahrenheit with 40 degrees Fahrenheit being the preferred temperature for cooling the elbows. To assure that the preferred water temperature is maintained, cooled water is continuously circulated through the tank 88. This is accomplished by a circulation pump 110 and a cooling means 112 shown in FIG. 3. The circulation pump 110 can be any suitable pump. The cooling means 112 can be any suitable means capable of cooling water pumped therethrough to between about 35 and 50 degrees Fahrenheit. Alternatively, the temperature of the water bath can be maintained at the desired temperature by any suitable means, such as providing a tank 88 with suitable insulation to maintain the temperature in the desired range.

The water in the tank 88 is pumped from the tank 88 through a drain (not shown) located near the conveyor belt 92. The circulation pump 110 pumps the water through appropriate piping from the drain to the cooling means 112 where the water is cooled. The circulation pump 110 then pumps the water back into the tank 88 through an inlet located in one side of the tank 88, as best shown in FIG. 3. The water is pumped into the tank 88 with sufficient force to create enough water flow to urge the elbows, as indicated by the arrows 89 in FIG. 3, from the point where they drop from paddle wheel 56 to a point near the end of the conveyor belt 92 contained within the tank 88. At this point, a suitable second pump 114 creates sufficient water flow to urge the elbows toward the conveyor belt 92, as indicated by the arrows 93 in FIG. 3. The elbows are then transported by the conveyor belt 92 from the tank 88 to a storage bin 94.

As previously mentioned, PVC pipe often vary in quality so that some pre-cut lengths tend to reduce in length more than others when heated. An adjustment mechanism (not shown) is located above and lengthwise along each side of the transfer plate 48 to help align the lengths of pipe 20 as they exit the heating chamber 22. The adjustment mechanism can be moved perpendicularly to the longitudinal axis of each pipe length 20 to assure that they are properly aligned to transfer from the transfer plate 48 to the two retaining hooks 50. Additionally, a pair of guide plates (not shown) are rigidly connected to the support frame (not shown) and located substantially parallel to and on the outside of each eccentric wiper arm 68, 70. The guide plates help to contain the lengths of pipe 20 within the bending forms 52A, 52B, 52C, and 52D when the pipe lengths 20 engage the eccentric wiper arms 68 and 70.

The preferred embodiment eliminates the tedious and laborious method of bending the PVC pipe in a handheld form previously utilized in the industry.

Other embodiments could be utilized without deviating from the scope of the present invention. For example, a linear system could be used where a pipe length is held within an arcuate die and linearly displaced thereby engaging a pair of eccentric wiper arms that urge the pipe length toward the arcuate die until the pipe length is formed thereagainst.

Moreover, the paddle wheel 56 could be provided with a large enough diameter to support a greater number of bending forms 52 than the preferred embodiment. A greater number of bending forms 52 disposed upon the shaft 66 would allow the rotational speed of the paddle wheel 56 to be decreased while maintaining the same, a decreased, or an increased rate of output. This would also allow for a longer cooling time.

The paddle wheel 56 could alternatively be rotated counterclockwise as viewed in FIG. 1. This would require repositioning of the eccentric wiper arms 68, 70 so that as a pipe length 20 is removed from retaining hooks 50 it would engage the wiper arms 68, 70 before dropping out of the arcuate die 62 into the water bath. In this manner, the wiper arms 68, 70 could extend to a point so that each pipe length 20 would engage the wiper arms 68, 70 until the rotation of the paddle wheel 56 lifted each pipe length out of the water bath where they could be removed from the arcuate die 62.

The preferred embodiment of the present invention provides a plurality of arcuate dies each having a constant radius of curvature. When a length of pipe 20 is formed against the arcuate die an elbow is obtained that has a substantially equal constant radius of curvature to that of the die. Alternatively, arcuate dies could be provided having a radius of curvature that is other than constant. For example, the center portion 63 of the arcuate die 62 could have a smaller radius of curvature than the rest of the die that divides the arcuate die 62 into two symmetrical segments that have the same radius of curvature. When a pipe length 20 is substantially formed against a die having this configuration an elbow will be obtained having a smaller radius of curvature at its center portion than the radius of curvature of the symmetrical segments.

Alternatively, the length of the arcuate die 62 could be extended so that the entire length of a pipe length 20 is formed against the die rather that having the end portions 36 of the pipe length overhang the outer edges of the die. If this embodiment were adopted part of the end portions of the die would have to have an eccentric radius of curvature so that the wiper arms 68, 70 could urge the end portions 36 of the pipe length 20 slightly past the constant radius portion of the die 62 to obtain the desired working degree of bend x.

Furthermore, an alternate arcuate die could be provided having a radius of curvature that is smaller near one end portion of the die than the remainder of the die. Thus, when a pipe length 20 is formed against a die of this configuration an elbow will be obtained that is substantially L-shaped. If alternative arcuate dies such as these are used it will be necessary to re-position the wiper arms 68, 70 relative to the longitudinal axis of the shaft 66 so that the end portions 36 of a pipe length 20 are urged toward the die until the pipe length is substantially formed thereagainst.

The pipe 20 may be made from various types of thermoplastic resins such as polyvinyl chloride (PVC) and acrylonitrile butadiene-styrene (ABS) resins. The pipe is used in construction as conduits for electric wires or as pipes to conduct water or for many other uses as is well known in the art.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What I claim is:

1. An apparatus for bending a length of thermoplastic resin pipe into an elbow comprising:
    means for heating the center portion of the length of pipe to a thermoplastic state;
    an arcuate die mounted on a shaft, the arcuate die having a center portion and end portions which provide bending surfaces against which the length of pipe may be formed, said arcuate die being relatively U-shaped in transverse cross section and adapted for receiving and supporting the center portion of the length of pipe;
    a first camming surface on one side of said arcuate die, said first camming surface including a first distal portion and a first proximal portion;
    a second camming surface on a side of said arcuate die opposite said one side;
    means for moving said arcuate die between a first position and a second position relative to said first and second camming surfaces, said first distal portion of said first camming surface being spaced farther from the longitudinal axis of the shaft of the arcuate die at said first position than said first proximal portion is spaced from the longitudinal axis of the shaft of the arcuate die at said second position, said arcuate die gradually approaching said first camming surface as said arcuate die moves along a line of travel from said first position to said second position whereby the end portions of the length of pipe engage said first and second camming surfaces and the end portion of the length of pipe which engages the first camming surface is forced toward the bending surfaces of said arcuate die until the length of pipe is formed into an elbow.

2. An apparatus of claim 1, wherein the center portion of the arcuate die has a narrower transverse U-shaped cross-section than the end portions of said arcuate die.

3. An apparatus for bending a length of pipe as recited in claim 2, further comprising:
    means for transporting the length of pipe through said heating means and delivering it to the arcuate die.

4. An apparatus for bending a length of pipe as recited in claim 3, wherein said heating means comprises:
    a heating element;
    a plate disposed below said heating element for absorbing some of the heat emitted from said heating element, said plate disposed beneath the length of pipe as it passes through said heating means so that part of the length of pipe is heated from below; and
    heat shields extending from said heating element to a point above the length of pipe as it passes through said heating means, said heat shields directing the heat emitted from said heating element primarily toward the center portion of the length of pipe.

5. An apparatus for bending a length of pipe as recited in claim 1, wherein said moving means comprises:
    said shaft being a rotatable shaft journalled in a fixed position relative to said first camming surface, said arcuate die connected to said shaft, the rotation of said shaft causing said arcuate die to move along said line of travel.

6. An apparatus for bending a length of pipe as recited in claim 5, further comprising:
    means for cooling the length of pipe immediately after the length of pipe is substantially formed against said arcuate die so that the length of pipe retains the shape as an elbow.

7. An apparatus for bending a length of pipe as recited in claim 6, wherein said cooling means comprises:
    a tank positioned relatively beneath said first camming surface and said arcuate die; and
    a coolant contained within said tank, said coolant being at a level below said first proximal portion of said first camming surface so that immediately after the length of pipe held in said arcuate die is substantially formed to said arcuate die the rotation of the shaft submerses the length of pipe within said coolant.

8. An apparatus for bending a length of pipe into an elbow as recited in claim 1,
    wherein said second camming surface includes a second distal portion and a second proximal portion, said second distal portion being spaced the same distance from the bending surface of the center portion of said arcuate die at said first position as said first distal portion, said second proximal portion being spaced the same distance from said bending surface of the center portion of said arcuate die at said second position as said first proximal portion so that as said arcuate die moves along said line of travel one end portion of the length of pipe held in said arcuate die engages said first camming surface and the other end portion of the length of pipe engages said second camming surface, said first and second camming surfaces urging both of the end portions of the length of pipe toward said arcuate die until the length of pipe is substantially formed into an elbow against said bending surfaces.

9. An apparatus for bending a length of pipe as recited in claim 8, wherein the end portions of the length of pipe overhang the end portions of said bending surfaces when the length of pipe is formed thereagainst, each of said proximal portions of the first and second camming surfaces being spaced adjacent to but not over the end portions of the bending surfaces of said arcuate die so that said first and second camming surfaces urge the end portions of the length of pipe slightly past the end portions of said bending surface thereby forming an initial working degree of bend in the length of pipe that is greater than a final degree of bend of the elbow when cooled.

10. An apparatus for bending a length of pipe as recited in claim 1, wherein the arcuate die is made of a material having a low thermal conductivity selected from the group of materials consisting of glass fiber reinforced polyester resins, thermoplastic resins and thermoset resins.

11. An apparatus for bending lengths of pipe into elbows comprising:
 a first camming surface, said first camming surface including a first distal portion and a first proximal portion;
 a second camming surface, said second camming surface including a second distal portion and a second proximal portion;
 a plurality of arcuate dies each defining a bending surface having a center portion and opposed end portions against which a length of pipe is formed, each of said arcuate dies being relatively U-shaped in transverse cross section and being adapted for receiving the center portion of one of the lengths of pipe;
 means for moving each of said arcuate dies between a first position and a second position relative to said first and second camming surfaces, said first and second distal portions being spaced farther from the bending surface of each of said arcuate dies at said first position than said first and second proximal portions are spaced from the bending surface of each of said arcuate dies at said second position, each of said arcuate dies gradually approaching said first and second camming surfaces as each of said arcuate dies moves along a line of travel from said first position to said second position so that one end portion of each length of pipe held in each of said arcuate dies engages said first camming surface and the other end portion of each length of pipe engages said second camming surface, said first and second camming surfaces thereby urging the end portions of each length of pipe toward said arcuate dies until each length of pipe is substantially formed against one of said bending surfaces,
 means for heating the center portion of the lengths of pipe before they are disposed on said arcuate dies; and
 means for transporting the lengths of pipe through said heating means.

12. An apparatus for bending lengths of pipe into elbows as recited in claim 11, wherein said moving means comprises:
 a rotatable shaft journalled in a fixed position relative to said first camming surface and second camming surface, said plurality of arcuate dies disposed upon said shaft, the rotation of said shaft causing each of said arcuate dies to move along said line of travel.

13. An apparatus for bending lengths of pipe into elbows as recited in claim 12, wherein said first camming surface and said second camming surface each include an eccentric portion and a constant radius portion.

14. An apparatus for bending lengths pipe into elbows as recited in claim 11, wherein:
 said first camming surface lies in a first relatively vertical plane, and said second camming surface lies in a second relatively vertical plane, said first and second distal portions being spaced closer horizontally to each other than said first and second proximal portions; and
 each of said first and second camming surfaces including a beveled surface portion, each of said beveled surface portions having progressively differing angles to remain substantially tangent to the surface area of each length of pipe contacting said beveled surface portions.

15. An apparatus for bending lengths of pipe into elbows as recited in claim 11, wherein each of said arcuate dies are constructed of a material having a thermal conductivity on the order of 1.10 Btu/(h)(ft)(°F.).

16. An apparatus for bending lengths of pipe into elbows as recited in claim 11, further comprising:
 means for cooling the lengths of pipe after they have been formed so that the lengths of pipe retain their elbow shape.

17. An apparatus for bending lengths of pipe into elbows as recited in claim 16, wherein said cooling means comprises:
 a tank being positioned relatively beneath said first and second camming surfaces, and said arcuate dies; and
 a coolant contained within said tank, said coolant being at a level below said first and second proximal portions so that immediately after each length of pipe held in one of said arcuate dies is substantially formed against said arcuate die, rotation of said arcuate dies submerses each length of pipe within said coolant.

18. An apparatus for bending lengths of pipe into elbows as recited in claim 17, further comprising:
 means for removing the lengths of pipe from said cooling means.

19. An apparatus for bending lengths of pipe into elbows as recited in claim 17, further comprising:
 storage means for orienting the lengths of pipe prior to being transported to said heating means; and
 means for transporting the lengths of pipe from said storage means to said heating means.

20. An apparatus for bending lengths of pipe into elbows as recited in claim 11, further comprising:
 storage means for orienting the lengths of pipe prior to being transported to said heating means; and
 means for transporting the lengths of pipe from said storage means to said heating means.

21. An apparatus for bending lengths of pipe into elbows as recited in claim 20, further comprising:
 means for sensing the absence of the lengths of pipe outside an entrance to said heating means, said sensing means activating said transporting means for transporting the lengths of pipe from said storage means to said heating means when an insufficient number of pipe lengths are adjacent said entrance whereby additional lengths of pipe are transported to said entrance.

22. An apparatus for bending lengths of pipe into elbows as recited in claim 11, wherein the end portions of each length of pipe overhang the end portions of the bending surfaces of the arcuate dies when said lengths of pipe are formed thereagainst, said first and second proximal portions of the camming surfaces being spaced adjacent but not over the end portions of the bending surfaces of the arcuate dies so that said first and second camming surfaces urge the end portions of each length of pipe slightly beyond the end portions of said arcuate dies to form a working degree of bend in each length of pipe that is greater than a final degree of bend of the elbows when cooled.

23. An apparatus for bending lengths of pipe into elbows as recited in claim 11, wherein the center portion of each of said arcuate dies has a narrower transverse U-shaped cross section than the end portions of said arcuate dies.

24. An apparatus for bending lengths of pipe into elbows as recited in claim 22, wherein the bending surface of the arcuate die is shaped to provide a working degree of bend for the elbows of approximately 95° and a final degree of bend for the elbows of approximately 90°.

* * * * *